BINARY DECODING POSITIONING DEVICE

Filed Nov. 10, 1966 2 Sheets-Sheet 1

WILLIAM H. SAYLOR
INVENTOR

BY [signature]
AGENT

Dec. 3, 1968 W. H. SAYLOR 3,414,854

BINARY DECODING POSITIONING DEVICE

Filed Nov. 10, 1966 2 Sheets-Sheet 2

WILLIAM H. SAYLOR
INVENTOR

BY Delmar H. Larsen
AGENT

United States Patent Office 3,414,854

Patented Dec. 3, 1968

3,414,854
BINARY DECODING POSITIONING DEVICE
William H. Saylor, 31791 S. Coast Highway, South Laguna, Calif. 92677
Filed Nov. 10, 1966, Ser. No. 593,384
14 Claims. (Cl. 335—268)

ABSTRACT OF THE DISCLOSURE

A positioning device operated by binary electrical signals provides an array of armatures abutting each other end-to-end, with stop means defining maximum gaps therebetween, the gaps being of binary power magnitudes and closeable by being energized by a respective binary signal, the composite position assumed by the device representing by way of example a decimal equivalent of the applied binary signal, and said position being useful to provide visual readout, printout, or other form of registration.

This invention relates to devices which are actuated by binary coded signals, to give a readout and/or printout, most generally in decimal form.

As is well known, many present-day computers, telemetering transmitters, and like apparatus present a signal in the form of binary code. In order for such a signal to be useful to the ultimate receptor, it generally must be transformed into decimal notation, or in some cases, a combination of decimal or alphabetic notation, with the result of such a transformation being presented in any of several fashions, separately or simultaneously, such as a readout or a printout. It is possible to accomplish this by feeding the binary signal into a suitable electronic module, which carries out the desired binary-to-decimal transformation, whereupon the resulting signal is fed to a suitable mechanical device capable of receiving a decimal signal and presenting it as a readout or a printout. Numerous attempts have been made to combine the two functions of display and decoding, this being desirable from many standpoints, including those of cost, compactness, and reliability. Some prior art solutions to this problem have not turned out to be practical, generally because of inherent mechanical clumsiness, leading to oversized units; the necessity of too high a power input to operate the device, which in turn complicates preamplifier design and leads to heat dissipation problems; and like considerations.

An object of the present invention is to provide a positioning device, the positioning element of which may be used to operate a printout or readout or both, which operates directly from binary signals which may be of relatively low wattage and short pulse duration; which is capable of being manufactured in an exceedingly compact and, particularly, thin form; and which can be manufactured so as to be mechanically reliable even after millions of cycles of operation.

Other objects of the present invention will appear as the description thereof proceeds.

In the drawings, FIGURE 1 is a schematic plan view of a simplified device embodying my invention.

FIGURE 5 is a plan of a preferred device in accordance with my invention, while

Figures 1, 2, 3, 4:
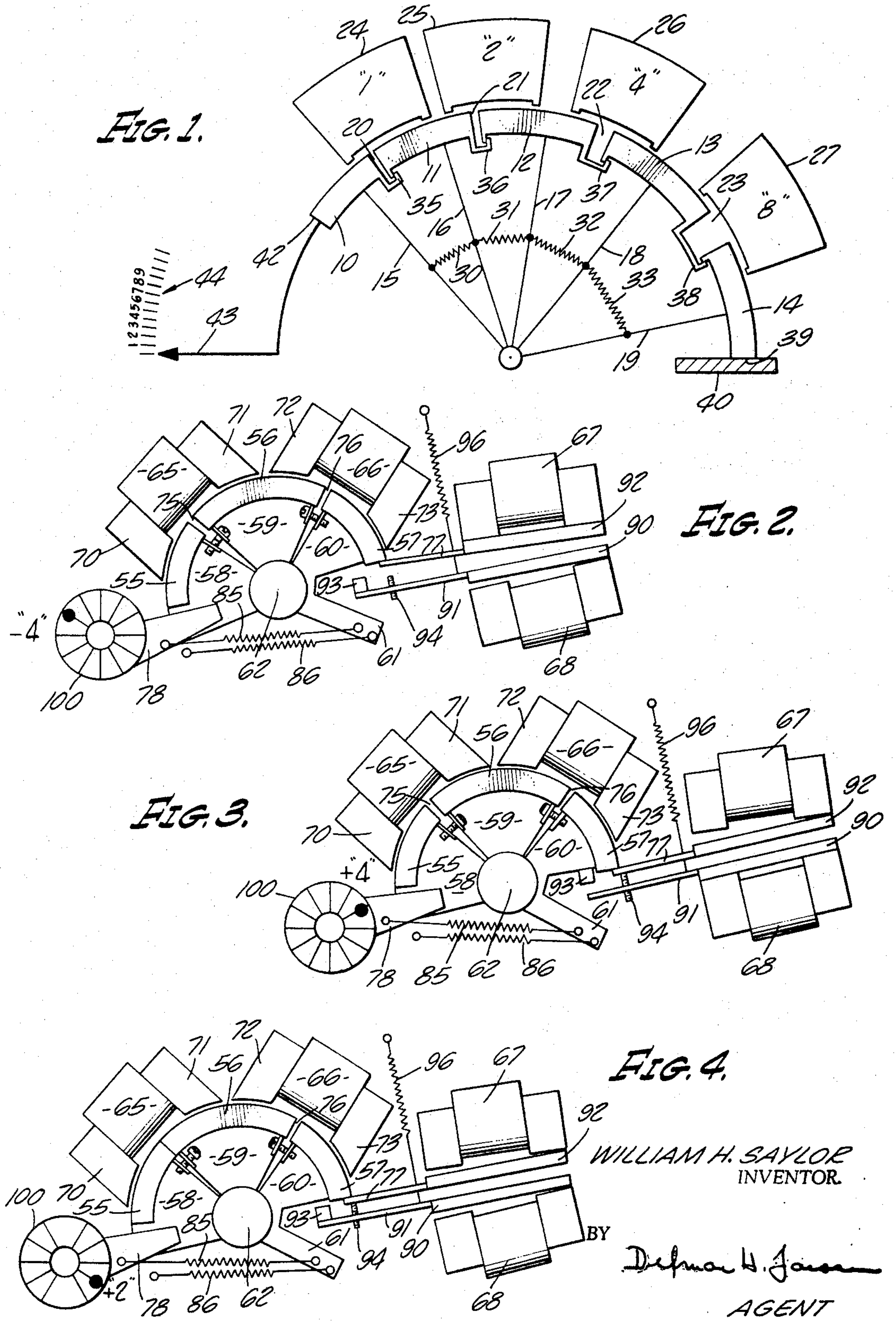
Figure 5:
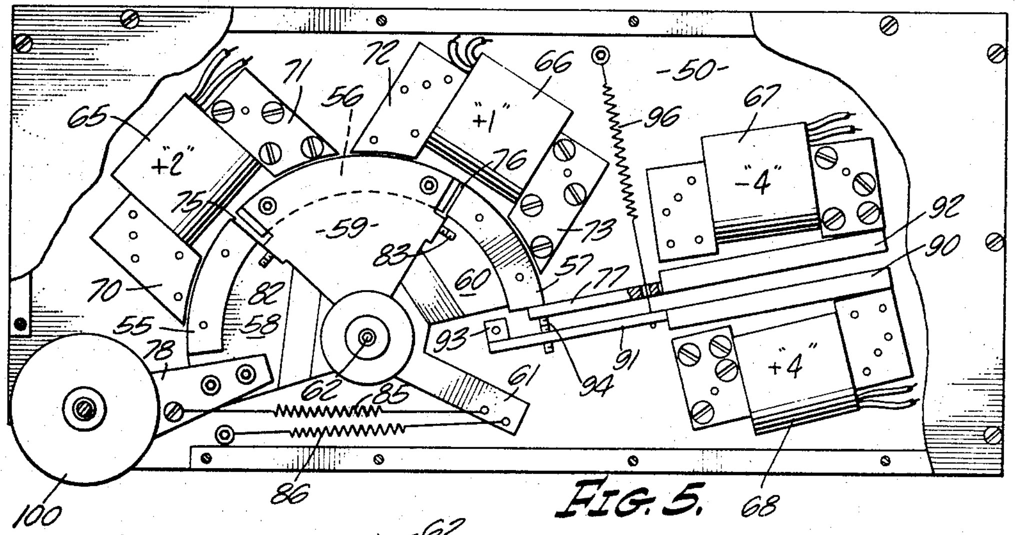

FIGURES 2, 3, and 4 are partially schematic views showing the device of FIGURE 5 in various positions according to the energizing signal applied.

Generally speaking and in accordance with illustrative embodiments of my invention, I provide a positioning device responsive to coded voltage systems of the type described which comprises an array of armatures which are arranged on arcs of a circle, with gaps between adjacent armatures. I use the latter term in its ordinary way as in the electromagnetic solenoid art; an armature is a piece of soft iron, generally, which moves as a result of the energizing of a coil to produce an electromagnetic field. I provide stop means between each pair of adjacent armatures, so as to define a maximum gap which may be assumed between the armature pair in question, and which at the same time permits closure of the gap. I also provide spring means which operate so as to urge the armatures apart so that, absent an externally applied electromagnetic field, the two armatures of each pair will be urged apart to the maximum extent permitted by the stop means. Furthermore, the armatures are attached to radius arm means, so that they may rotate only along the arcs of the aforementioned circle. I further provide for each such gap an electromagnetic coil having two separated pole pieces, with the pair of pole pieces positioned across the gap of its associated armature pair. Thus, when a given coil is actuated by an applied voltage, the magnetic field causes the corresponding gap to close. As stated, one such coil is provided for each of said gaps, constituting an array of such coils.

It will be evident from the above general description that as the coils are variously energized, the corresponding gaps will close, so that the total arc occupied by the array of armatures will assume different values in accordance with which gaps are closed and which gaps are open, so that the total arc exhibits a summation of the gap closures and therefore of the coded signal.

Thus, I may provide four armatures with three gaps, and further, may arrange the relative magnitudes of the maximum gaps to have values of 1, 2, and 4 respectively, these being angular measure. Or, I may provide five armatures with four gaps, with relative magnitudes of 1, 2, 4, and 8.

In the latter case, if a four-place signal in binary code is applied, the gap closure will cause the array of armatures to occupy a total arc which has a 1:1 correspondence to the decimal equivalent of said binary signal.

Turning now to FIGURE 1, this illustrates in schematic fashion a device in accordance with my invention. Armatures 10, 11, 12, 13, and 14 are attached to their respective radius arms 15, 16, 17, 18, and 19, to give gaps 20, 21, 22, and 23 respectively, each of which is bridged by a corresponding electromagnetic coil 24, 25, 26, and 27, each having pole pieces as shown straddling the corresponding gap. Springs 30, 31, 32, and 33 are in a compressed state, and urge their associated radius arms and, therefore, their associated armatures to spread apart so as to hold each gap in a maximum position, absent energizing of the coil. Stop means 35, 36, 37, and 38 are also provided, which as may readily be seen from the drawing, permit each gap to close completely when the coil is energized, but prevent each gap from appearing greater than a maximum value. In the device of FIGURE 1, these values have angular magnitudes of 1, 2, 4, and 8 respectively. The last armature 14 has its rear end 39 fixed to a frame portion 40 of the device, which is fixed with respect to the axis of the radius arms.

Still referring to FIGURE 1, it will be evident that when none of the coils is energized, all gaps will be open, and the front end 42 of the armature array will be in the extreme position as shown in the drawing. As various of the gaps are closed by the energizing of their respective coils, the front end 42 of the armature array will assume various positions corresponding to the decimal equivalent of the signal. This is used to provide a simple visual readout by pointer 43, which is attached to armature 10, and scale 44.

The device described in FIGURE 1 is eminently practical although it suffers from the practical disadvantage that mechanical considerations hold the designer to a value for the smallest gap 20 which must not be excessively small. The largest gap 23 is necessarily eight times as wide as the smallest gap 20, and this poses a considerable burden on coil 27 in overcoming the reluctance of this large gap. In my preferred embodiment, to be described below, I utilize the basic principle which I have described and exemplified in FIGURE 1. By using a lesser number of armatures in the primary array, I am able to hold all gaps involved to narrow dimensions, so that the demands made on the coils are not great, which results in a device responding to relatively low input signal strengths. The remaining figures of the drawings exhibit this preferred device.

Turning now to FIGURE 5, this shows a base plate 50 on which the several components of the device are directly or indirectly mounted. I provide three armatures, 55, 56, and 57, which are attached to radius arms 58, 59, and 60, respectively, all pivoted about a central point 62. Coils 65 and 66 provide pole pieces 70, 71, and 72, 73, respectively, which bridge the two gaps 75 and 76 appearing in this array of three armatures. The rear or last armature 57 bears against an end stop 77; while the first or front armature 55 is connected through its radius arm 58 to a readout arm 78. Stops in the form of detent tabs 80 and 81 co-act with adjustable set screws 82 and 83 respectively, so as to limit the maximum value which the respective gaps may assume, which in this device have relative magnitudes of 1 and 2 for gaps 76 and 75, respectively.

Spring means 85 urges the three armatures apart so that in the absence of energizing of coils 65 and 66, this armature array occupies a maximum of arc. At the same time, I provide spring means 86, which acts between the frame 50 and an extension 61 of the radius arm 60 so as to urge the last or rear armature 57 against the stop arm 77. (Spring means 85 is tensed between this same extension 61 and readout arm 78).

In order to provide a device which responds to a binary signal or more than two places, and indeed in the present case, to a four-place binary signal, I make provision for a shift in position of stop arm 77, and moreover, to one of two positions departing from its rest or neutral or unenergized position shown in FIGURE 5, by plus 4 or minus 4 units respectively, this referring to the one-unit gap 76 and the two-unit gap 75. I accomplish this by providing a coil 68 which acts on an armature 90 as to pull auxiliary stop arm 91 to which it is connected in a downward or clockwise direction; and by providing a further coil 67 which acts on an armature 92 which is connected to stop arm 77, and which when energized moves that stop arm in an upward, or counter-clockwise direction. Auxiliary stop arm 91 is restrained from further upward movement by block 93, and it also carries a set screw 94 which bears against stop arm 77. Further, auxiliary stop arm 91 is urged in an upward direction by tension spring 96, which, however, must be strong enough to overcome the rotational moment provided by spring means 86, but not so strong as to prevent the movement of auxiliary stop arm 91 in response to coil 68 acting on armature 90. For convenience in assembly, spring 96 passes through an aperture in stop arm 77, but is otherwise not connected to the latter.

When coil 67 is energized, accordingly, stop arm 77 moves upwardly or counter-clockwise by four units. If coil 68 is separately energized, auxiliary stop arm 91 is pulled downwardly or counter-clockwise against the tension of spring 96, and stop arm 77 follows it downwardly because it rests against set screw 94 and because radius arm 60 is moved downward by force of spring 86 acting on arm 61. Both coils 67 and 68 are not simultaneously energized, this being avoided as discussed below.

The disposition of the various armatures is schematically illustrated for three different applied signals in FIGURES 2, 3, and 4 which are readily understood in the light of the foregoing explanation. Thus, FIGURE 2 corresponds to a signal applied to coil 67 only, which rotates the armature array counter-clockwise by four units, indicated by clockwise rotation of readout wheel 100 by four units. In FIGURE 3, a signal has been applied to coil 68 only, resulting in counter-clockwise rotation of the readout wheel 100 by four units. In FIGURE 4, a signal has been applied only to coil 65, resulting in counter-clockwise rotation of the readout wheel 100 by two units.

The manner of connecting the binary input signal to the coils will be obvious to those skilled in the art. For example, using the apparatus of FIGURE 1, and receiving a pure binary code, coils 24, 25, 26, and 27 are connected respectively to the first, second, third, and fourth binary positions, having relative values of 1, 2, 4, and 8 respectively.

When using the apparatus of FIGURE 5, some typical connections are shown in the tables which follow. The first is for pure binary code, while the second is for cyclic Gray code. The column marked "readout" is the decimal number to be read out, while the column marked "position" is the position of the readout/printout wheel 100. The body of each table shows the binary number to be decoded and read out, and the column headings A, B, C, and D, indicate gap shifts of magnitude 1, 2, 4, and minus 4, respectively, which as has been explained hereinabove, corresponds to coils 66, 65, 68, and 67, respectively.

TABLE 1

| Readout | D | C | B | A | Position |
|---|---|---|---|---|---|
| 0 | 0 | 0 | 0 | 0 | 0 |
| 1 | 0 | 0 | 0 | 1 | 1 |
| 2 | 0 | 0 | 1 | 0 | 2 |
| 3 | 0 | 0 | 1 | 1 | 3 |
| 4 | 0 | 1 | 0 | 0 | 4 |
| 5 | 0 | 1 | 0 | 1 | 5 |
| 6 | 0 | 1 | 1 | 0 | 6 |
| 7 | 0 | 1 | 1 | 1 | 7 |
| 8 | 1 | 0 | 0 | 0 | −4 |
| 9 | 1 | 0 | 0 | 1 | −3 |
| + | 1 | 0 | 1 | 0 | −2 |
| − | 1 | 0 | 1 | 1 | −1 |

TABLE 2

| Readout | A | B | C | D | Position |
|---|---|---|---|---|---|
| 0 | 0 | 0 | 0 | 1 | −4 |
| 1 | 0 | 0 | 1 | 1 | −2 |
| 2 | 0 | 0 | 1 | 0 | 2 |
| 3 | 0 | 1 | 1 | 0 | 6 |
| 4 | 0 | 1 | 0 | 0 | 4 |
| 5 | 1 | 1 | 0 | 0 | 5 |
| 6 | 1 | 1 | 1 | 0 | 7 |
| 7 | 1 | 0 | 1 | 0 | 3 |
| 8 | 1 | 0 | 1 | 1 | −1 |
| 9 | 1 | 0 | 0 | 1 | − |

The device can also be used for binary systems other than the two already discussed in which ambiguity would be introduced by the necessity of both coils 67 and 68 being simultaneously energized. This is accomplished by providing a simple circuit in the input module which converts 11 to 00 for the C and D signals. Such a circuit is commonplace in the art and need not be described in detail. The adaptation to such binary number systems is shown in the following tables, wherein the rows with an asterisk indicate that a circuit has been introduced to carry out the conversion just discussed. Table 3 is for the so-called "Excess 3" binary code, while Table 4 is for "(2421)" code.

TABLE 3

| Readout | D | C | B | A | Position |
|---|---|---|---|---|---|
| 0 | 0 | 0 | 1 | 1 | 3 |
| 1 | 0 | 1 | 0 | 0 | 4 |
| 2 | 0 | 1 | 0 | 1 | 5 |
| 3 | 0 | 1 | 1 | 0 | 6 |
| 4 | 0 | 1 | 1 | 1 | 7 |
| 5 | 1 | 0 | 0 | 0 | −4 |
| 6 | 1 | 0 | 0 | 1 | −3 |
| 7 | 1 | 0 | 1 | 0 | −2 |
| 8 | 1 | 0 | 1 | 1 | −1 |
| 9 | *1 | 1 | 0 | 0 | 0 |
| + | *1 | 1 | 0 | 1 | 1 |
| − | *1 | 1 | 1 | 0 | 2 |

TABLE 4

| Readout | A | C | B | D | Position |
|---|---|---|---|---|---|
| 0 | 0 | 0 | 0 | 0 | 0 |
| 1 | 0 | 0 | 0 | 1 | −4 |
| 2 | 0 | 0 | 1 | 0 | 2 |
| 3 | 0 | 0 | 1 | 1 | −2 |
| 4 | 0 | 1 | 0 | 0 | 4 |
| 5 | 1 | 0 | 1 | 1 | −1 |
| 6 | 1 | 1 | 0 | 0 | 5 |
| 7 | *1 | 1 | 0 | 1 | 1 |
| 8 | 1 | 1 | 1 | 0 | 7 |
| 9 | *1 | 1 | 1 | 1 | −3 |

It is evident that the position taken by the device, which in the primary instance is the position of readout arm 78, may be employed in a variety of fashions, depending on the type of readout desired. In the embodiment shown in the drawings, readout arm 78 comprises at its extreme end a sector gear 101, the teeth of which engage pinion gear 102, which is connected to readout-printout drum or wheel 100. In my preferred embodiment, the figures on the rim of wheel 100 are raised typeface, so that printout can be readily obtained showing the position of the wheel by means commonplace in the art, generally involving the mutual impact of the wheel with paper and a carbon ribbon or the like. Needless to say, applicable portions of such standard devices as typewriters, adding machines, cash registers, and the like may be operatively connected to the printout wheel to give the particular form of record desired.

Figures 6, 7, 8:
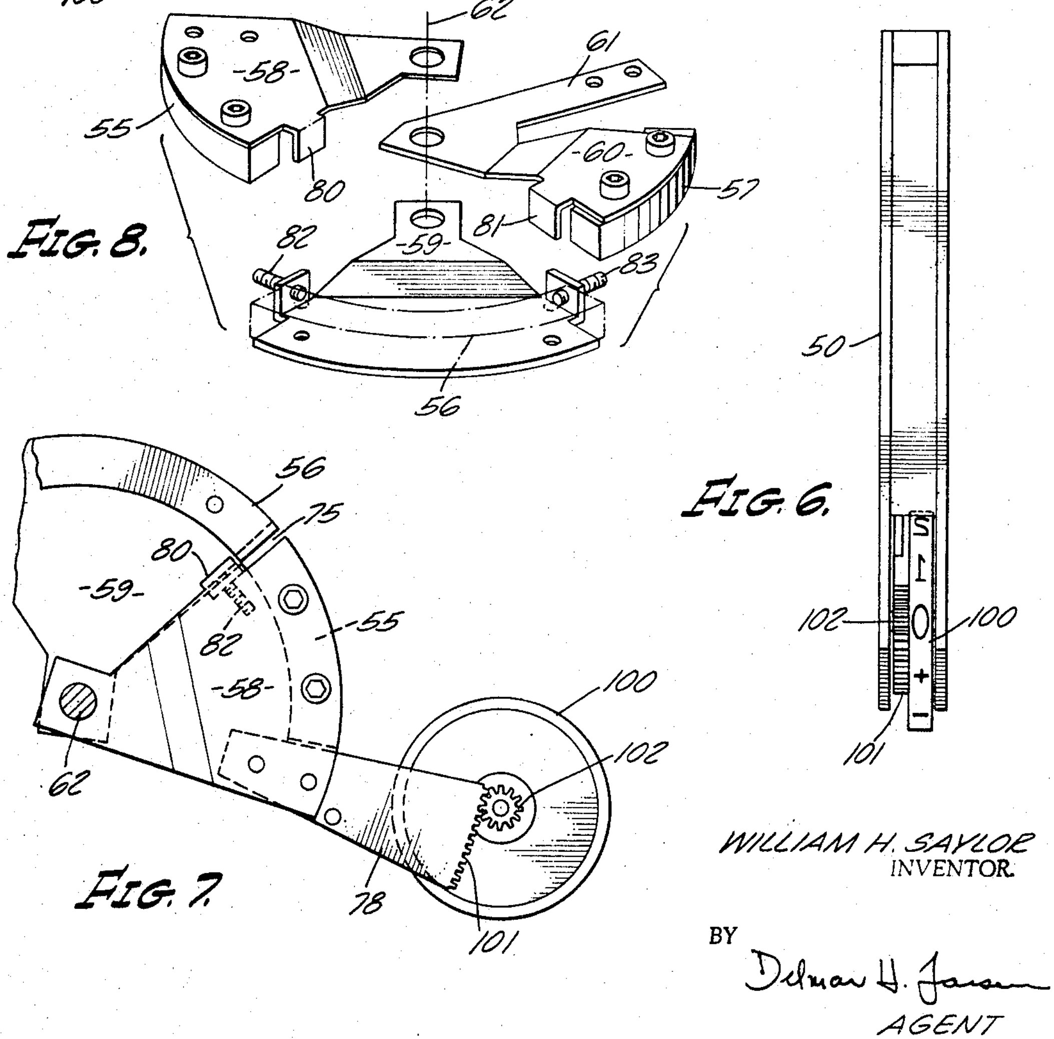
FIGURE 6 is an end view thereof.
FIGURE 8 is an exploded perspective detail view of an armature array of the device of FIGURE 5.
FIGURE 7 is a detail view of the readout-printout portion of the device of FIGURE 5.

In the embodiment shown in FIGURE 5, a more highly successful and practical working model has been constructed wherein the dimensions of plate 52 are 2½ inches by 5½ inches, and the thickness as shown on FIGURE 6 is ¼ inch. This allows the ganging of any desired number of my inventive readout-printout modules to accomodate any desired number of decimal places in the final readout, while still conserving space.

It may be mentioned that the arrangement which I have described, as exemplified by the devices of FIGURES 1 and 5, has great practical advantage, in that the primary armatures are all pivoted about a single point, which enables sturdy mechanical design, particularly in achieving friction-free movement, and retaining mechanical separation even over long periods of operation.

A great practical advantage possessed by devices in accordance with my invention should be pointed out. It will be apparent that in accordance with my invention, and considering in particular the arrangement whereby the gaps formed by an array of armatures such as I have disclosed are closed by the energizing of an electromagnet, only the armatures forming the gap move, while the electromagnet, including its coil, core, and pole pieces, remain stationary. This, in itself, eliminates many difficulties which would otherwise arise, such as the provision of flexible leads to the coils if they were to move, support means to keep the entire assembly in alignment, the considerable weight of the electromagnets if they were to be moved, and the like.

Over and above these advantages, however, it should be noted that the flux path from the pole pieces to the armature is completely tangential to the movement of the armature. Thus, the armatures respond only to the flux across the gap, and are indifferent to any magnetic forces between the armature and the pole pieces, because of the tangential nature of the latter. Thus, in the device of FIGURE 5, the flux from pole piece to armature is radial with respect to the axis of the circle.

It will be evident that in my device gaps between adjacent armatures sometimes move without the gap in question either closing or opening, the motion resulting from other gaps closing or opening. The pole pieces positioned across a gap must accordingly be spaced far enough apart that all possible positions of the associated gap will always fall between the respective pole pieces. This is, of course, self-evident, and it will be clear from the drawings that this condition has been met.

The materials of construction employed are those usual in the art and do not call for detailed discussion. For example, in the embodiment shown in FIGURE 5, base plates 50 and 52 are conveniently of aluminum, as is frame 51, and radius arms 58, 59, and 60. Armatures are of soft iron, and other working parts of non-magnetic stainless steel. The printout wheel is of hardened steel.

It will be evident that while I have described my invention with the aid of numerous specific examples and embodiments, considerable variation in detail, proportions, relative size, and the like is possible within the broad scope of the invention which is to be limited only by the claims which follow.

Having described the invention, I claim:

1. A positioning device responsive to coded voltage signals comprising:

an array of armatures, said armatures arranged on arcs of a circle with gaps between adjacent armatures;

stop means between each pair of adjacent armatures defining a maximum gap therebetween and permitting closure of said gap;

spring means acting between said adjacent pairs of armatures urging said armatures apart to said maximum gaps;

radius arm means restraining said armatures to motion along said circle; and an array of electromagnetic coils each providing a pair of separated pole pieces, each said pair of pole pieces being positioned across one of said gaps;

whereby energizing of any of said coils by said coded signals causes corresponding gap closures, whereby the total arc occupied by said array of armatures exhibits a summation of said gap closures and therefore of said coded signal.

2. A device in accordance with claim 1 which includes:

end stop means at one end of said armature array;

spring means urging said armature array against said end stop means;

whereby the position of the other end of said armature array corresponds to said summation.

3. A device in accordance with claim 2 in which said array of electromagnetic coils is held in fixed position with respect to said end stop means.

4. A device in accordance with claim 1 wherein said pole pieces are tangential to said armatures, whereby flux between each said pole piece and its associated armature is radial with respect to said circle.

5. A device in accordance with claim 1 wherein said maximum gaps have relative magnitudes of 1, 2, and 4.

6. A device in accordance with claim 1 wherein said maximum gaps have relative magnitudes of 1, 2, 4, and 8.

7. A device in accordance with claim 2 which includes:

end stop positioning means comprising at least one end-stop electromagnet, said end-stop positioning means having a zero-signal position and an energized position for each of said end-stop electromagnets.

8. A device in accordance with claim 7 wherein two end-stop electromagnets are provided, the first of which provides an energized position of magnitude 4 compared to the smallest of said maximum gaps, and the second of which provides an energized position of magnitude 4 in the opposite direction to that of said first end-stop electromagnet.

9. A device in accordance with claim 8 wherein said armature array comprises three armatures and said electromagnetic coil array comprises two such coils, said two corresponding gap closures having magnitudes respectively of 1 and 2.

10. A positioning device comprising:

two electromagnetic coils each having two pole pieces, said pole pieces being adjacent to the exterior of a circular arc and defining first, second, third, and fourth pole pieces;

three armatures of generally arcuate shape adjacent to the interior of said circular arc and defining a front end, a first gap, a second gap, and a rear end in the recited order, said first armature being adjacent said first pole piece, said second armature being adjacent both said second and third pole pieces, and said third armature being adjacent said fourth pole piece;

radius plate means attached to said armatures and pivoted about a common center;

stop means limiting gap separation between said first and second, and between said second and third armatures to gaps of relative magnitude of 1 and 2 in any order, while permitting said gaps to close;

first end stop bar means abutting against said rear end of said third armature and capable of movement toward said third armature;

auxiliary end stop bar means contacting said first end stop bar means and capable of movement away from said third armature;

a fourth armature carried by said first end stop bar means;

a fifth armature carried by said second end stop bar means;

an electromagnetic coil having pole pieces adjacent said fourth armature and operating when energized to cause said movement toward said third armature;

an electromagnetic coil having pole pieces adjacent said fifth armature and operating when energized to cause said movement away from said third armature;

spring means urging said first, second, and third armatures to mutually separate;

spring means urging said third armature towards said first end stop bar means;

spring means urging said auxiliary end stop bar means towards said first end stop bar means; and position registering means operatively connected with said first armature to indicate the relative position thereof.

11. A device in accordance with claim 10 in which the gaps defined by said first three armatures have relative magnitudes of 1 and 2, and in which the said movements of said end stop bar means each have relative magnitudes of 4.

12. A device in accordance with claim 11 whereby said position registering means comprises a print wheel.

13. A positioning device responsive to coded voltage signals comprising an array of armatures in end-to-end abutment so as to provide closeable junctures at each said end-to-end abutment;

stop means limiting each end-to-end separation formed by said armatures; said stop means providing relative separations for said end-to-end separations respectively of 1, 2, and successive powers of 2;

spring means operating on said array of armatures so as to separate said armatures apart from each other;

a plurality of electromagnetic coil means, each said means straddling one of said junctures and each when energized providing magnetic flux through its respective armature-pair juncture; and registration means responsive to the total length of said array under varying conditions of energizing of the various said electromagnetic coils.

14. A device in accordance with claim 13 in which said magnetic flux between each said coil and its respective armatures is tangential to said armatures.

References Cited

UNITED STATES PATENTS

| | | | |
|---|---|---|---|
| 3,089,131 | 5/1963 | Morgan | 335—268 |
| 3,303,283 | 2/1967 | Scheffel | 178—34 |
| 3,307,676 | 3/1967 | Hickerson | 178—34 |

BERNARD A. GILHEANY, *Primary Examiner.*

H. BROOME, *Assistant Examiner.*